United States Patent [19]

Kimura

[11] Patent Number: 4,844,768
[45] Date of Patent: Jul. 4, 1989

[54] APPARATUS FOR ATTACHING BELT-LIKE MATERIALS

[75] Inventor: Hidetoshi Kimura, Kodaira, Japan

[73] Assignee: Bridgestone Corporation, Japan

[21] Appl. No.: 181,346

[22] Filed: Apr. 14, 1988

[30] Foreign Application Priority Data

Apr. 14, 1987 [JP] Japan ................................ 62-92590

[51] Int. Cl.⁴ .......................................... B65H 26/06
[52] U.S. Cl. .................. 156/361; 156/405.1; 156/406.4; 156/512; 425/28.1; 425/301
[58] Field of Search ................ 425/28.1, 301; 83/206, 83/277, 267; 156/133, 405.1, 361, 406.4, 512

[56] References Cited

U.S. PATENT DOCUMENTS

| 4,163,685 | 8/1979 | Kubinski | 156/405 R |
| 4,465,536 | 8/1984 | Makino et al. | 156/133 |
| 4,526,647 | 7/1985 | Portalupi et al. | 156/406.4 |
| 4,596,617 | 6/1986 | Ishii | 156/130.3 |

FOREIGN PATENT DOCUMENTS

| 57-105336 | 6/1982 | Japan . | |
| 57-125030 | 8/1982 | Japan . | |
| 58-42445 | 3/1983 | Japan . | |
| 59-207227 | 11/1984 | Japan . | |
| 60-54841 | 3/1985 | Japan . | |
| 60-79938 | 5/1985 | Japan . | |
| 2108060 | 5/1983 | United Kingdom | 156/133 |

Primary Examiner—Jay H. Woo
Assistant Examiner—Khanh P. Nguyen
Attorney, Agent, or Firm—Sughrue, Mion, Zinn, Macpeak & Seas

[57] ABSTRACT

An apparatus for attaching belt-like materials has a rotating unit for rotating a forming drum, a holding unit located apart from the forming drum for holding continuous belt-like materials along entire widths to be supplied to the forming drum, embracing units located between the forming drum and the holding units for embracing the belt-like materials along entire widths. A reciprocating unit is used for reciprocating the embracing units between the holding unit and the forming drum. A cutting unit is used for cutting in width directions the belt-like materials held by the holding unit and the embracing units. The apparatus includes control unit for controlling the rotating unit and the reciprocating unit so that circumferential speeds of the forming drum and moving speeds of the embracing means are at a constant ratio.

8 Claims, 10 Drawing Sheets

FIG_1

FIG_2

FIG_4

FIG_5

FIG_6

FIG_7a

FIG_7b

FIG_7c

FIG_7d

FIG_7e

FIG_7f

FIG_8

APPARATUS FOR ATTACHING BELT-LIKE MATERIALS

BACKGROUND OF THE INVENTION

This invention relates to an apparatus for attaching belt-like materials onto a forming drum.

Belt-like material attaching apparatus have been known for example, as disclosed in Japanese Patent Application Publication No. 22,619/86. The apparatus disclosed in the Publication comprises a material locating plate and a material restraining arm located forward of a forming drum for gripping a leading end of a belt-like material. A driving mechanism is used for driving the material locating plate and the material restraining arm gripping the belt-like material in unison to the forming drum. A pawl-ratchet is located immediately before the forming drum and adapted to engage the belt-like material to prevent it from returning. A cutting unit is located before the forming drum for cutting the material in width directions. A press roll is employed for pressing the belt-like material supplied immediately above the forming drum against it.

In attaching a belt-like material to the forming drum with the apparatus disclosed in the Publication, a leading end of the belt-like material is first urged against the material locating plate by the material restraining arm to grip the leading end from upper and lower sides. Under this condition, the material locating plate, the material restraining arm and the belt-like material are moved in unison toward the forming drum to supply the leading end of the material to the forming drum. At this time, the pawl-ratchet engages the leading end of the material to prevent it from returning. After the belt-like material is then released from the gripping of the material locating plate and the material restraining arm, these members for gripping are returned to their original positions by means of the driving mechanism. Thereafter, the leading end of the material is pressed to the forming drum by means of the press roll, and the forming drum is rotated through a predetermined angle to attach a predetermined amount of the belt-like material to the forming drum. Then the belt-like material is cut along its width direction by the cutting unit without restraining the belt-like material. Thereafter, the forming drum is again rotated to attach a remaining portion of the cut belt-like material to the forming drum and the leading and trailing ends of the material are jointed on the drum.

With such an apparatus of the prior art, however, the cutting of material is apt to be inaccurate as a first disadvantage because the proximity of the cutting portion of the material is not held during being cut. Since the trailing end of the belt-like material is not held after cutting, the material often undergoes unstable movement as a second disadvantage which would make it difficult to join the leading and trailing ends of the material uniformly. As a result, tires formed by the belt-like materials in this manner are inferior in uniformity.

SUMMARY OF THE INVENTION

It is a principal object of the invention to provide an improved apparatus for attaching belt-like materials, which is able to cut the materials accurately, to attach remaining portions of the materails under an appropriate tensile force to a forming drum and to joint leading and trailing ends of the materials uniformly.

In order to achieve this object, the apparatus for attaching belt-like materials according to the invention comprises rotating means for rotating a forming drum, holding means located apart from said forming drum for holding continuous belt-like materials along their entire widths to be supplied to the forming drum, embracing means located between said forming drum and the holding means for embracing the belt-like materials aong their entire widths, reciprocating means for reciprocating said embracing means between the holding means and the forming drum, cutting means for cutting the belt-like materials in their width directions along lines between said holding means and said embracing means which have been stopped in the proximity of said holding means, said belt-like materials being held by said holding means and said embracing means, and control means for controlling said rotating means and said reciprocating means so that circumferential speeds of the forming drum and moving speeds of embracing means are at a constant ratio, thereby after holding one portions of the belt-like materials attached to said forming drum with predetermined amounts along their entire widths by means of said holding means and embracing means, cutting said belt-like materials between said holding means and embracing means by means of said cutting means, and rotating said forming drum, while moving said embracing means embracing trailing ends of the belt-like materials toward said forming drum in controlling said circumferential speeds of said forming drum and said moving speeds of said embracing means at a constant ratio to attach remaining portions of the cut belt-like materials to said forming drum under an appropriate tensile force.

With this arrangement, in order to cut belt-like materials whose predetermined amounts have been already attached to the forming drum, the materials upstream of the forming drum are held before and behind the portions to be cut by means of holding and embracing means. Then the materials are cut along their width directions between the holding and embracing means. Since the materials are held before and behind the portions to be cut over their entire widths, cutting is accurately effected. After cutting, the holding means holds the leading ends of the materials over the entire widths, while the embracing means holds the trailing ends of the cut materials over the entire widths, so that any deformation is prevented. Thereafter, the forming drum is rotated by the rotating means, and at the same time the embracing means embracing the trailing ends of the materials is moved toward the forming drum by means of the reciprocating means to attach the remaining parts of the materials to the forming drum. In such an operation, the rotating means and the reciprocating means are so controlled by means of the control means that the circumferential speeds of the forming drum and the moving speeds of the embracing means are at a constant ratio. As a result, the remaining portions are applied to the forming drum under an appropriate tensile force, and the leading and trailing ends of the materials are accurately brought into contact with each other even if there are irregularities in circumference of the material attached to the forming drum. In this case, moreover, since the trailing ends of the materials are embraced by the embracing means over their entire widths, the trailing ends are transferred exactly to predetermined positions while being prevented from deforming. Thereafter, the embracing means release the belt-like materials. At this time, the belt-like materials have been attached to the forming drum over one circumference, and their leading and trailing ends have been uniformly jointed. Thereafter, the embracing means are moved to the proximity of the holding means by the reciprocating means.

In order that the invention may be more clearly understood, preferred embodiments will be described by way of example, with reference to the accompanying drawings.

DESCRIPTION OF THE PREFERRED EMBODIMENT

Figure 1:
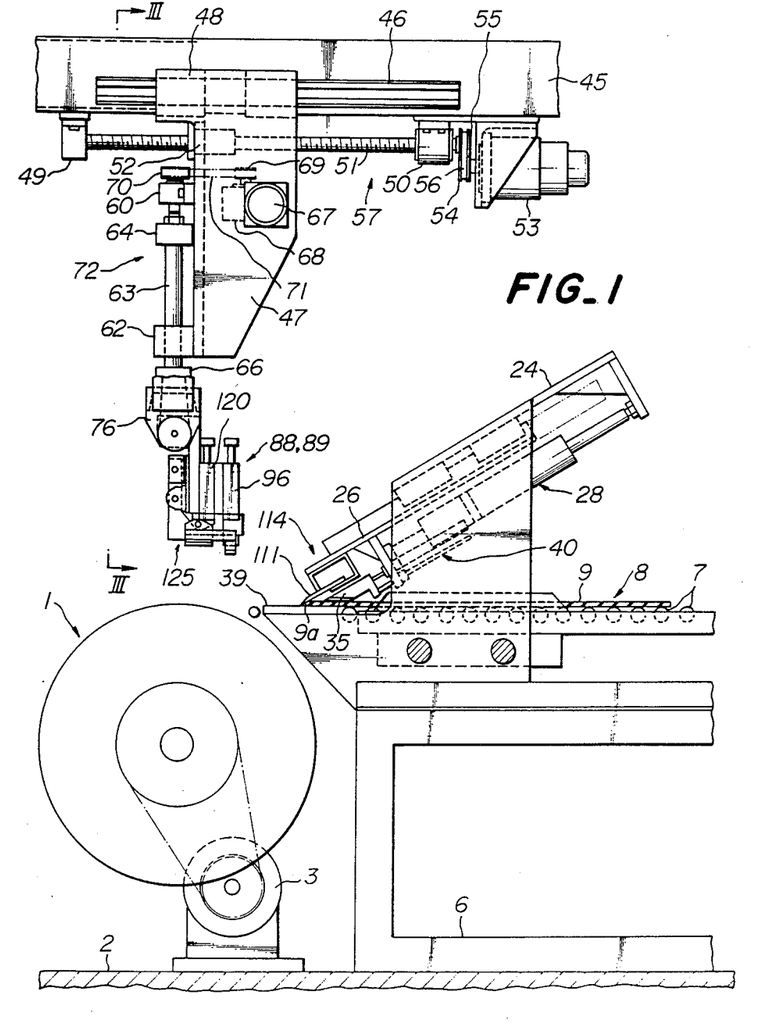
FIG. 1 is a front elevation illustrating one embodiment of the apparatus according to the invention.

FIG. 1 illustrates a rotatable forming drum 1 for forming green tires. The forming drum 1 is rotated required rotating numbers at optional speeds by means of a DC servomotor 3 having a reduction gear unit as driving means arranged on a floor 2. A frame 6 is located on the floor 2 behind the forming drum 1. Transfer means 8 comprising a number of rollers 7 in parallel with the forming drum 1 is supported on the frame 6 for transferring two continuous belt-like materials 9 as bead fillers or the like toward the forming drum 1.

Figure 2:
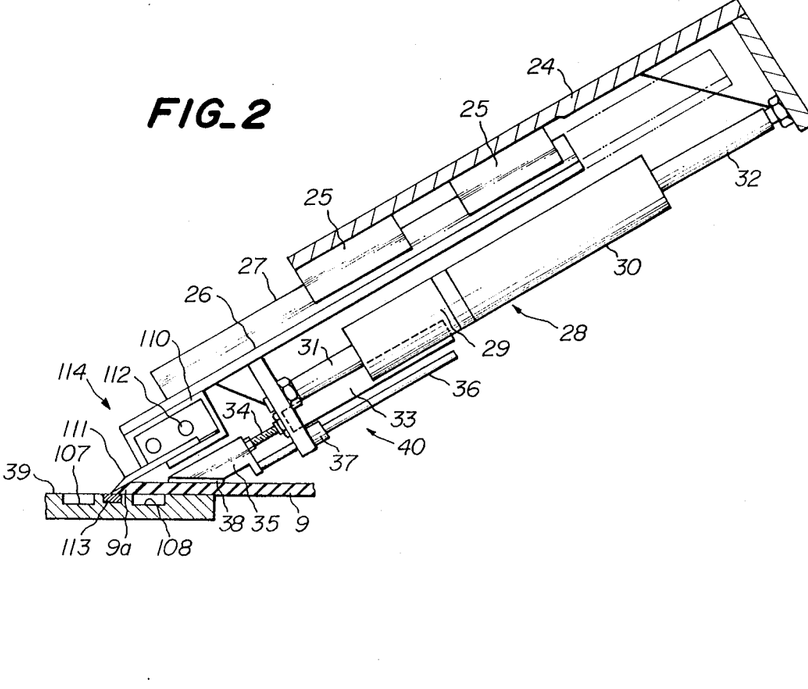
FIG. 2 is a front elevation partially in section of proximities of holding means and cutting means used in the apparatus shown in FIG. 1.

Referring to FIGS. 1 and 2, a forward and downward inclined bracket 24 is mounted on a forward end of the frame 6. Slide blocks 25 are fixed to the bracket 24. A rail 27 is fixed to an upper surface of a carriage 26 and slidably engages the slide blocks 25 to enable the carriage 26 to move along the bracket 24. Heads of two cylinders 29 and 30 are connected to each other to form a double acting piston-cylinder assembly 28 whose piston rods 31 and 32 are connected at their outer ends to the carriage 26 and the bracket 24, respectively. A number of cylinders 33 spaced in width direction of the belt-like materials 9 are fixed to the bracket 24. Holding bocks 35 are fixed to front ends of piston rods 34 of these cylinders 33 to cover entire widths of the belt-like materials, respectively. Guide rods 36 are fixed at their front ends to the holding blocks 35 to prevent rotation of the holding blocks 35 and slidably inserted a slide metal 37 fixed to the carriage 26.

Rubber layers 38 made of a silicon rubber easily elastically deformable and having a good peeling property are attached by heating and pressing to lower surfaces of the holding blocks 35 adapted to be in contact with the belt-like materials 9 so that the contact between the holding blocks 35 and the belt-like materials 9 is made uniform, while the holding blocks 35 are prevented from directly contacting the belt-like materials 9. A flat anvil 39 is fixed to the frame 6 immediately below the holding blocks 35. The belt-like materials 9 move on the anvil 39. As a result, when the holding blocks 35 approach the anvil 39 by operation of the double acting piston-cylinder assembly 28 or the cylinders 33, the belt-like materials 9 are pressed with their overall widths against the anvil 39 by means of the holding blocks 35 so that the belt-like materials 9 are held and restrained thereat. The cylinder 33, the holding blocks 35 and the anvil 39 are located as a whole spaced from the forming drum 1 to form holding means 40 for holding the continuous belt-like materials 9 over their entire widths to be supplied to the forming drum 1.

Figure 3:
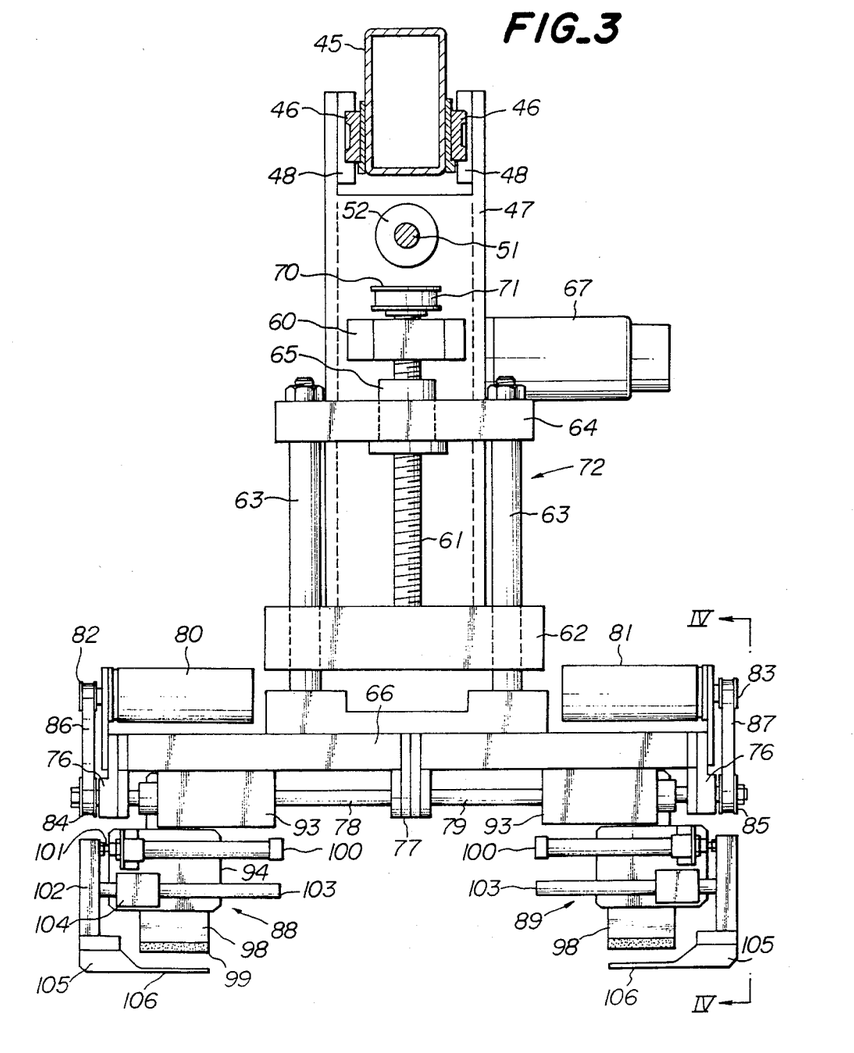
FIG. 3 is a sectional view taken along line III—III in FIG. 1.

Referring to FIGS. 1 and 3, above the forming drum 1 there are provided a beam 45 extending substantially in parallel with the direction of the materials 9 and horizontal rails 46 fixed to both side surfaces of the beam 45. A traveling frame 47 having sliders 48 fixed to an upper portion thereof is hung from the beam 45 with the aid of the sliders 48 fitted on the rails 46 and supported movably in the extending directions of the beam 45. The beam 45 has on its lower surface a pair of bearings 49 and 50 spaced in the extending directions of the beam 45 for rotatably supporting a screw-threaded rod 51 which is threadedly engaged in an internally threaded block 52.

A DC servomotor 53 is fixed to the beam 45 in rear of the bearing 50. A belt 56 extends about a pulley 54 fixed to the motor 53 and a pulley 55 fixed to the screw-threaded rod 51. With this arrangement, when the DC servomotor 53 is energized to rotate the screw-threaded rod 51, the traveling frame 47 is reciprocatively driven along the rails 46. The traveling frame 47, the screw-threaded rod 51 and the motor 53 form reciprocating means 57 as a whole for reciprocating embracing means 88 and 89 later described between the holding means 40 and a location slightly above the forming drum 1.

A bearing 60 is fixed to a front surface of the traveling frame 47 to support and upper end of a vertical screw-threaded shaft 61 (FIG. 3) rotatably. A block 62 is fixed to the traveling frame 47 directly below the bearing 60 for supporting a lower end of the screw-threaded shaft 61. A pair of lifting rods 63 slidably extend through the fixed block 62 in parallel with the screw-threaded shaft 61. A lifting plate 64 is secured to upper ends of the lifting rods 63. To the lifting plate 64 is fixed a block 65 into which the screw-threaded shaft 61 is threadedly engaged. A lifting frame 66 is secured to lower ends of the lifting rods 63. To the traveling frame 47 is fixed a motor 67 whose driving force is transmitted to a pully 69 through a worm reduction unit 68. A belt 71 extends about the pulley 69 and a pulley 70 fixed to the screw-threaded shaft 61. With this arrangement, when the motor 67 is energized to rotate the screw-threaded shaft 61, the lifting frame 66 is raised or lowered together with the lifting rods 63 and the lifting plate 64. The screw-threaded shaft 61, the lifting frame 66 and the motor 67 form lifting means 72 as a whole for raising or lowering the embracing means 88 and 89 later described.

Referring to FIGS. 1, 3, 4 and 5, brackets 76 and 77 are fixed to the lifting frame 66 at both ends and a mid portion for rotatably supporting screw-threaded shafts 78 and 79 coaxial with each other extending in width directions of the belt-like materials. DC servomotors 80 and 81 are fixed to the lifting frame 66 at the ends, respectively. Belts 86 and 87 extend about pulleys 82 and 83 mounted on shafts of the servomotors 80 and 81 and pulleys 84 and 85 mounted on the screw-threaded shafts 78 and 79, respectively. With this arrangement, when the servomotors 80and 81 are energized to rotate the screw-threaded shafts 78 and 79, the embracing means 88 and 89 threadedly engaged with the screw-threaded shafts 78 and 79 move along the screw-threaded shafts 78 and 79 to determine positions of the belt-like materials 9 in their width directions.

Guide rails 90 are fixed to the lifting frame 66 immediately above the screw-threaded shafts 78 and 79, respectively. Slide blocks 91 of the embracing means 88 and 89 are slidably engaged on the guide rails 90, respectively.

Figure 5:
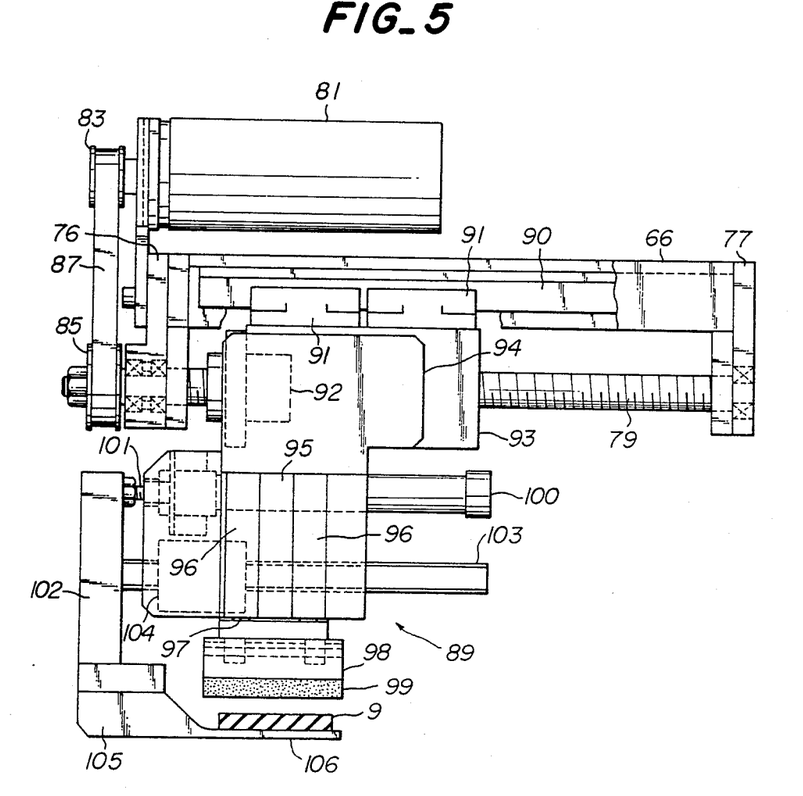
FIG. 5 is a front elevation viewed in a direction shown by arrows V in FIG. 4.

Each of the embracing means 88 and 89 comprises a traveling block 93 having an internally threaded block 92 secured thereto threadedly engaged with the screw-threaded shaft 78 or 79. A vertical plate 94 is secured to the traveling block 93. A pair of vertical cylinders 96 are secured thrugh a bracket 95 to the vertical plate 94 on its front side. An embracing pad 98 longer than the maximum width of the belt-like materials 9 is secured to outer ends of piston rods 97 of the cylinders 96 (FIG. 5). A rubber layer 99 made of silicon rubber easily elastically deformable is attached to a lower surface of the embracing pad 98 which is directly in contact with the belt-like materials 9.

A horizontal cylinder 100 is fixed to the vertical plate 94 on a rear side. A support holder 102 is secured to an outer end of a piston rod 101 of the horizontal cylinder 100. A slide shaft 103 is fixed to the support holder 102 and slidably inserted into a slide bush 104 secured to the vertical plate 94. A horizontal embracing body 105 is fixed to a lower end of the support holder 102 and is provided at an end with a flat embracing portion 106 located directly below the embracing pad 98 when the piston rod 101 is retracted in the cylinder 100.

The traveling block 93, the vertical plate 94, the cylinder 96, the embracing pad 98, the cylinder 100 and the as a whole the embracing body 105 form embracing means 88. In the above explanation, the embracing means 88 has been described shown on the left side viewed in FIG. 3. It is of course that those shown on the right side viewed in FIG. 3 form embracing means 89 as a whole. Each of the embracing means 88 and 89 serves to embrace the belt-like material 9 over the entire width of the material extending between the holding means 40 and the location immediately above the forming drum 1. When the embracing portion 106 of the embracing body 105 arrives at the anvil 39, the embracing portion 106 enters a straight groove 107 or 108 formed in the anvil 39 (FIG. 2) and an upper surface of the embracing portion 106 is flush with an upper surface of the anvil 39.

Referring again to FIGS. 1 and 2, a holder 110 is secured to a front end of the carriage 26 for supporting a cutting blade 111 for cutting the belt-like materials along their width directions. The holder 110 includes a heater 112 for heating the cutting blade 11. On the other hand, a pad 113 made of synthetic resin such as MC nylon is embedded in the anvil 39 at a location with which a tip of the cutting blade 111 is in contact between the straight grooves 107 and 108 for preventing damage of the tip of the cutting blade 111. The holder 110, the cutting blade 111 and the pad 113 form cutting means 114 for cutting in width directions the belt-like materials 9 held between the holding means 40 and the embracing means 88 and 89.

Figure 4:
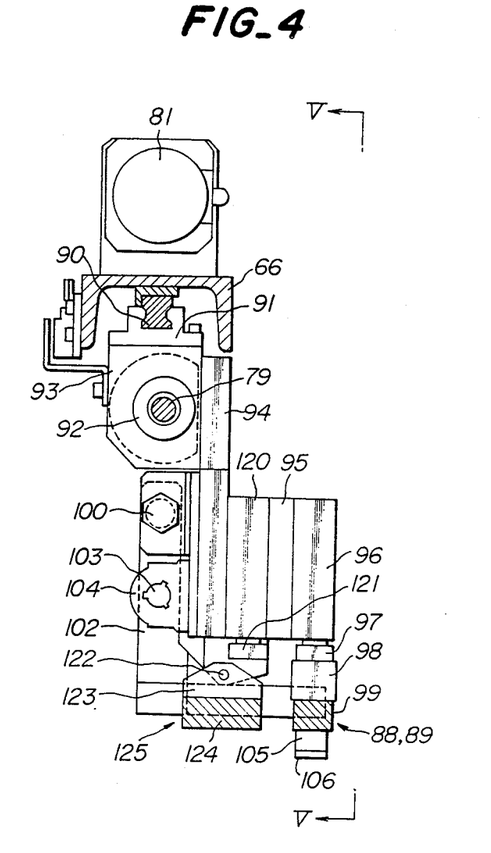
FIG. 4 is a side elevation viewed in a direction shown by arrows IV in FIG. 3.

Referring to FIGS. 1, 4 and 5, a pair of cylinders 120 in parallel with the cylinder 96 are provided on the bracket 95 forward from the cylinder 96. Press pads 123 are rockably connected by pins 122 to outer ends of piston rods 121 of the cylinders 120. Rubber layers 124 similar to the rubber layer 99 are attached to lower surfaces of the press pads 123 so that the belt-like materials 9 are uniformly pressed against the forming drum 1 by the press pads 123 even if thicknesses of the materials 9 are not uniform. The cylinders 120 and the press pads 123 form press means 125 as a whole for pressing leading ends of the belt-like materials 9 to the forming drum 1 when the leading ends of the materials 9 have been transferred onto the forming drum 1 by means of the embracing means 88 and 89.

Figure 6:
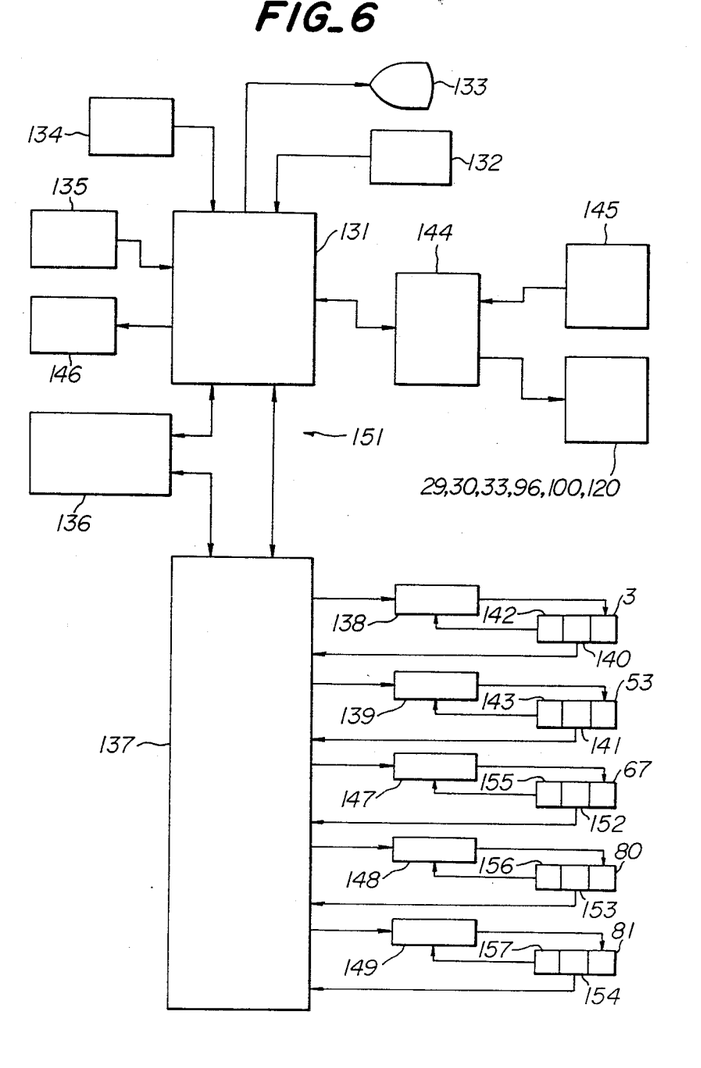
FIG. 6 illustrates a block diagram of a control system for the apparatus according to the invention.

FIG. 6 illustrates a control system for the apparatus above described according to the invention. Reference numeral 131 denotes an operation sequence control device for memorizing predetermined operation programs, positional informations and the like. The operation programs to be stored in the device 131 are inputted from, for example, a panel switch 132 and a display unit 133 for confirming various informations. The positional informations to be stored in the device 131 are inputted from a teaching unit 134. Moreover, on the panel switch 132 there are provided switches for starting and stopping the apparatus and operating switches for operating an external auxiliary memory device 135 and the like in addition to switches for making the programs. Positional information reproduced in the operation sequence control device 131 according to the operation program are fed to a data processor 136, in which rotating speeds and rotating numbers of the motor 3 and 53 are computed on the basis of various parameters previously stored. If the computed results exceed the previously stored limit speed and number, alarm signals are fed to the operation sequence control device 131 to stop all the operations of the apparatus.

When the computed results are fed from the data processor 136 to a path positioning control unit 137, the unit 137 energizes the motors 3 and 53 through a driver 138 for the forming drum 1 and a driver 139 for the embracing means. Therefore, the forming drum 1 is controlled in rotating speed, number of rotation and positioning. On the other hand, the embracing means 88 and 89 are controlled in moving speed, distance to move and paths. The operation sequence control device 131, the data processor 136 and the path positioning control unit 137 form control means 151 as a whole for controlling the motors 3 and 53 to control the forming drum 1 and the embracing means 88 and 89 in a manner keeping constant a ratio of circumferential speeds of the drum 1 to moving speeds of the embracing means 88 and 89. As a result, the operations are easily controlled, while the belt-like materials 9 are attached to a tire blank with their leading and trailing ends being accurately accorded under appropriate tensile forces. The path positioning control unit 137 controls the motor 67, 80 and 81 through drivers 147, 148 and 149. Moreover, upon rotation of the motors 3, 53,67, 80 and 81, signals are fed from pulse generators 140, 141, 152, 153 and 154 and speed detector 142, 143, 155, 156 and 157 to the path positioning control unit 137 and the drivers 138, 139, 147, 148 and 149 to effect known servo-control.

Referring more to FIG. 6, an input and output control unit 144 transmits operating signals from an operating unit 145 to the operation sequence control device 131 and transmits control signals from the operation sequence control device 131 to the cylinders 29, 30, 33, 96, 100 and 120 to control the operations of these cylinders. The operating unit 145 is provided with an alteration switch for changing over the operation mode, switches for starting and stopping and pilot lamps. Moreover, the external auxiliary memory device 135 is able to register or read out the retention programs in conjunction with the operation sequence control device 131. Reference number 146 denotes a printer for outputting the programs retained and stored in the external auxiliary memory device 135 and the operation sequence control device 131.

The operation of the apparatus according to the embodiment will be explained hereinafter.

It is assumed that leading ends 9a of belt-like materials 9 are pressed against the anvil 39 by means of the holding blocks 35 and held by the holding means 40 over their entire widths preventing contractive deformations of the materials. When the motors 53 and 67 are energized to rotate the screw-threaded shafts 51 and 61, the embracing means 88 and 89 are guided along rails 46 and the lifting rods 63 so as to approach the leading ends 9a of the belt-like materials 9 on the anvil 39. When the embracing portions 106 of the embracing means 88 and 89 have arrived on an extension lines of the straight grooves 108, the motors 53 and 67 are deenergized.

Figure 7A:
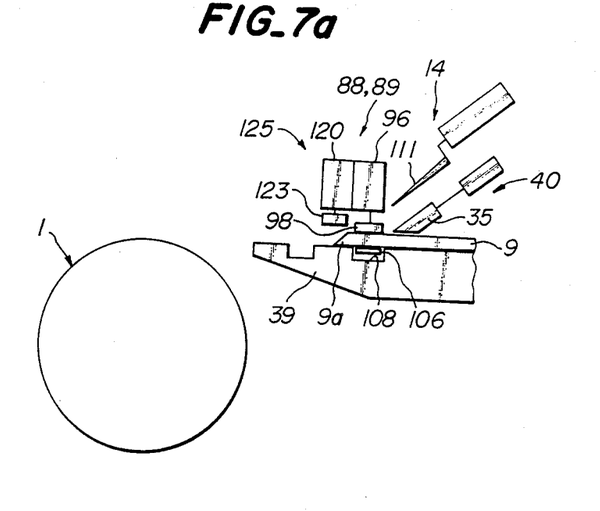
FIGS. 7a–7f are schematic illustrations for explaining the operation of the apparatus according to the invention.

Then, the piston rods 101 of the cylinders 10 of the embracing means 88 and 89 are retracted to insert the embracing bodies 105 guided by the slide shafts 103 into the straight grooves 108 and at the same time to bring the embracing portions 106 into opposition to the embracing pads 98. At this moment, the upper surfaces of the embracing portions 106 and the anvil 39 are flush with each other, and lower surfaces of the belt-like materials 9 are supported by the embracing portions 106. The cylinders 96 of the embracing means 88 and 89 are then actuated to extend their piston rods 97 so that the embracing pads 98 are lowered toward the embracing portions 106. The belt-like materials 9 are embraced over the entire widths between the embracing pads 98 and the embracing portions 106 on above and below sides in this manner. Such a condition is shown in FIG. 7a.

Then, the piston rods 34 of the respective cylinders 33 are simultaneously retracted to move the holding blocks 35 guided by the guide rods 36 away from the belt-like materials 9 so that the materials 9 are released from the holding means 40. The motor 67 is then energized to raise the embracing means 88 and 89 slightly by means of the lifting means 72 so as to remove the embracing portions 106 from the straight grooves 108. Thereafter, the motor 53 is energized to rotate the screw-threaded rod 51 so that the embracing means 88 and 89 are caused to approach the forming drum 1 by means of the reciprocating means 57 to transfer the leading end 9a of each of the materials 9 to a location immediately above a top of the forming drum 1. During such a movement, each of the continuous belt-like materials 9 is forward transferred with the aid of the rotation of the rollers 7 of the transfer means 8.

Figure 7B:
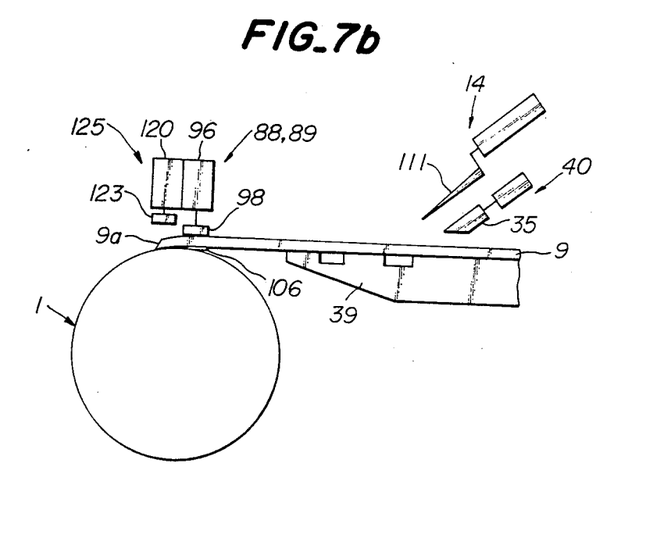

Since each of the materials 9 is always embraced over the entire width by the holding means 40 and the embracing means 88 or 89, even if the material 9 tends to contract, the cut front surface of the material at the leading end is restrained so as not to deform so that a straightness at the leading end of the material is kept at it was cut. Thereafter, when the leading end 9a of the belt-like material 9 embraced by each of the embracing means 88 and 89 has arrived at a predetermined position on the top of the forming drum 1, the motor 53 is deenergized. Such a conditon is shown in FIG. 7b.

Figure 7C:
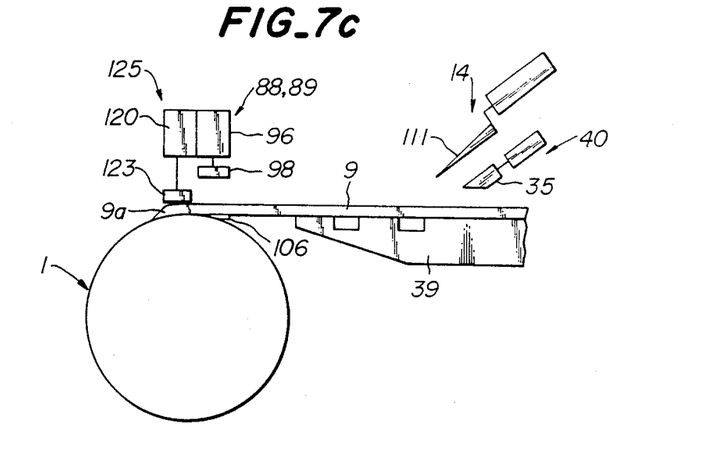

The cylinder 120 of each of the press means 125 is then actuated to extend its piston rod 121 so that the leading end 9a of the belt-like material 9 forward overhanging from the embracing means 88 or 89 is pressed against the forming drum 1 by means of the press pad 123. Thereafter, the cylinder 96 of each of the embracing means 88 and 89 is actuated to retract the piston rod 97 so that the embracing pad 98 is spaced from the belt-like material 9 to release it from the embracing action of the embracing pad 98. Since the leading end 9a of the belt-like material 9 is embraced over its entire width by means of each of the embracing means 88 and 89 until a moment immediately before the pressing by the press pad in this manner, any deformation of the leading end 9a of the material being pressed is completely prevented. Such a condition is shown in FIG. 7c.

Thereafter, the motors 53 and 67 are energized to rotate the screw-threaded shafts 51 and 61 so that the embracing means 88 and 89 are moved to locations in the proximity of the holding means 40. When the embracing portions 106 move away from the forming drum 1, the piston rods 101 of the cylinders 100 are extended to retract the embracing portions 106 from the positions immediately below the embracing pads 98. At the same time, the motor 3 is energized to rotate the forming drum 1 through a predetermined angle at a predetermined speed so that the belt-like materials 9 are pulled by the forming drum 1 and predetermined amounts of the materials are attached onto the forming drum 1. In the attaching operation, when the embracing portions 106 of the embracing means 88 and 89 arrive at locations on the extension lines of the straight grooves 107, the motors 53 and 67 are deenergized. Thereafter, the piston rods 101 of the cylinders 100 are retracted to insert the embracing portions 106 into the straight grooves 107, thereby supporting the belt-like materials by the embracing portions 106 under the materials.

When the attaching of the materials 9 to the forming drum 1 has been completed and the rotation of the drum 1 has stopped, the piston rods 97 of the cylinders 96 are extended so that the belt-like materials 9 are embraced over their entire widths by the embracing pads 98 and the embracing portions 106. Thereafter, the piston rod 32 of the cylinder 30 is extended to cause the carriage 26 to move a predetermined distance toward the anvil 39. The piston rods 34 of the respective cylinders 33 are then extended to drive the holding blocks 35 toward the anvil 39 so that the belt-like materials 9 are pressed against the anvil 39 by the holding blocks 35 and held thereat. As a result, the belt-like materials 9 are held before and behind the cutting positions by means of the embracing means 88 and 89 and the holding means 40.

The piston rod 31 of the cylinder 29 is then extended to cause the carriage 26 to approach the anvil 39 further. As a result, the piston rods 34 of the cylinders 33 are retracted because the holding block 35 is stationary, while the holding block 35 continues to hold the belt-like materials 9 with the aid of the anvil 39 because inner pressures in the cylinders 33 are kept at constant values. When the carriage 26 approaches the anvil 39 in this manner, the belt-like materials held between the holding means 40 and the embracing means 88 and 89 are cut in their width directions by the cutting blade 111 moved together with the carriage 26. As a result, the belt-like materials 9 attached to the forming drum 1 are separated from the continuous belt-like materials.

Figure 7D:
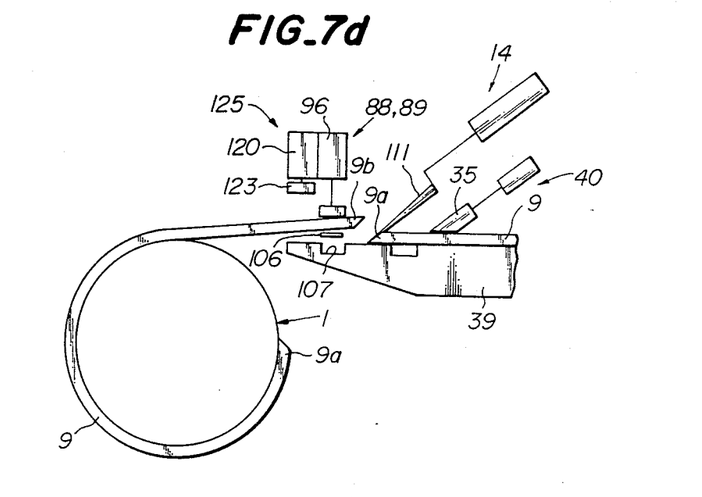

Since the belt-like materials 9 are held over the entire widths at the positions in front and rear of the cutting positions by the holding and embracing means 40, 88 and 89, the cutting of the materials is accurately effected. According to the invention, the holding blocks 35 and the anvil 39 hold the leading ends of the continuous belt-like materials over their entire widths, while the embracing pads 98 and the embracing bodies 105 hold the trailing ends 9b of the cut belt-like materials 9 over their entire widths. Upon termination of the cutting, the motor 67 is energized to slightly raise the embracing means 88 and 89 so as to remove the embracing portions 106 from the straight grooves 107. Such a condition is shown in FIG. 7d.

Figure 8:
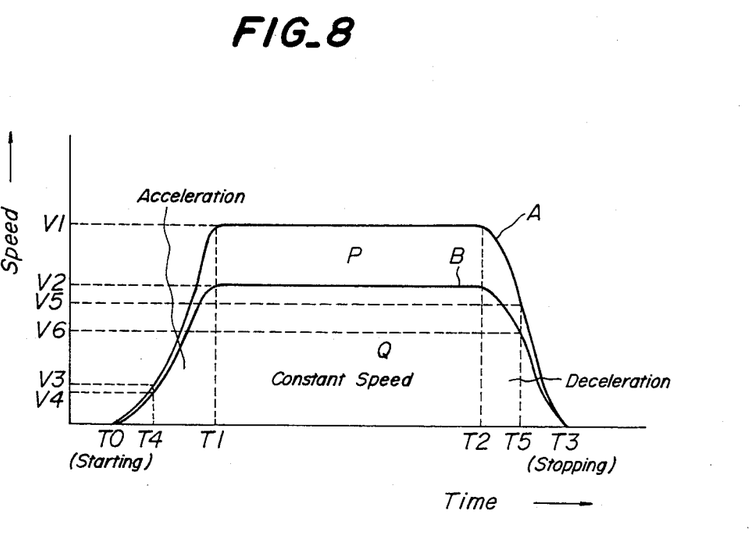
FIG. 8 is a graph for explaining rotating conditions of motors for driving the forming drum and the embracing means of the apparatus according to the invention.

At this time, the trailing ends 9b of the belt-like materials 9 cut away from the continuous materials are embraced by the embracing means 88 and 89. Thereafter, the trailing ends 9b of the materials are brought onto the forming drum 1 and attached to circumference of the forming drum 1. For this purpose, the motor 3 and 53 are controlled by, for example, a continuous path control. In the continuous path control, operating time and operating speed between two points in connection with the motors 3 and 53 are shown in FIG. 8. The motor 3 for the forming drum 1 operates substantially along a curve A. The motor 53 for the embracing means 88 and 89 operates substantially along a curve B. Areas P and Q surrounded by the curves A and B indicate rotating amounts or angles of the motors 3 and 53, respectively. The values of the rotating amounts are equal to cumulations of feedback pulses originating from the pulse generation equipment 140 and 141 according to the rotation of the motors 3 and 53, respectively. The difference in area between P and Q results from the difference between a rotating distance of the forming drum 1 and a moving distance of the embracing means 88 and 89 respectively corresponding to one feedback pulse (generally referred to as "pulse rates"). These valves are computed on the basis of pulse rates previously stored in the data processing unit 136.

In general, it is preferable to attach the belt-like materials 9 under appropriate tensile forces. In this embodiment, therefore, the moving distances of the embracing means 88 and 89 from the time (T0) starting to attach the remaining portion of the cut material to the time (T3) at which the attaching is completed is slightly shorter than the rotating distance of the forming drum 1 during the same period of time. In this case, moreover, the control for attaching the materials is so effected that a ratio of moving speed of the embracing means 88 and 89 to circumferential speed of the forming drum 1 is a constant at any continuous points. For example, ratios of a circumferential speed V3 of the drum 1 to a moving speed V4 of the embracing means 88 and 89 at an initial acceleration time (T4), the maximum circumferential speed V1 of the drum 1 to the maximum moving speed V2 of the embracing means 88 and 89, and a circumferential speed V5 of the drum 1 to a moving speed V6 of the embracing means 88 and 89 at an initial deceleration time (T5) are all equal constant values which are equal to a value obtained by dividing the area Q by the area P. As a result, the remaining portions of the cut belt-like materials 9 can be attached to the forming drum 1 while the materials are subjected to appropriate tensile forces. Even if there are irregularities in the materials attached to the drum 1 in circumferential directions, the leading and trailing ends of the materials 9 can be accurately in contact with each other without any clearance irrespective of such irregularities.

In order to carrying out the path control as above described, it is required to start and stop the motors 3 and 53 simultaneously although they have to move different distances. Therefore, the data processor 136 computes moving amounts of the motors 3 and 53 on the basis of positional informations of these motors outputted from the operation sequence control device 131. Then the motor whose moving amount is larger than that of the other motor is determined. Such a motor is the motor 3 in this embodiment. The maximum speed V1 and acceleration and deceleration curves of the motor 3 are determined. Then, an operating time (T3-T0) between two points are determined from the arithmetic results, and the maximum speed V2 and acceleration and deceleration curves are determined such that the motor 53 whose moving amount is smaller arrives at a target point in the above described operating time. From the above arithmetic results, time-speed curves A and B and times T1, T2 and T3 at respective points on the way from the Time T0 when a starting command is outputted.

Thereafter, the data processor 136 time-divides the obtained curves A and B into very short periods, for example, milliseconds to output moving amounts at the respective points to the path positioning control unit 137. As a result, the path positioning control unit 137 outputs to the drivers 138 and 139 signals proportional to the moving amounts and at the same time monitors feedback pulses from the pulse generators 140 and 141 for the respective motors 3 and 53. In this manner, the motors 3 and 53 are driven along the curves A and B according to the instructions from the data processor 136 to complete the control the movement between the two points.

Figure 7E:
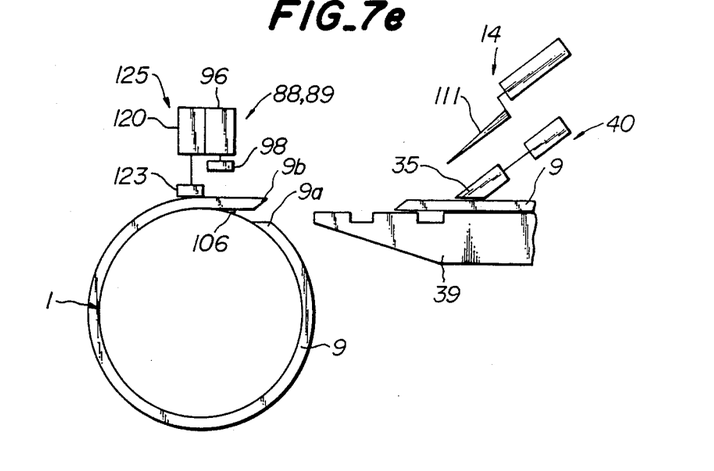
Figure 7F:
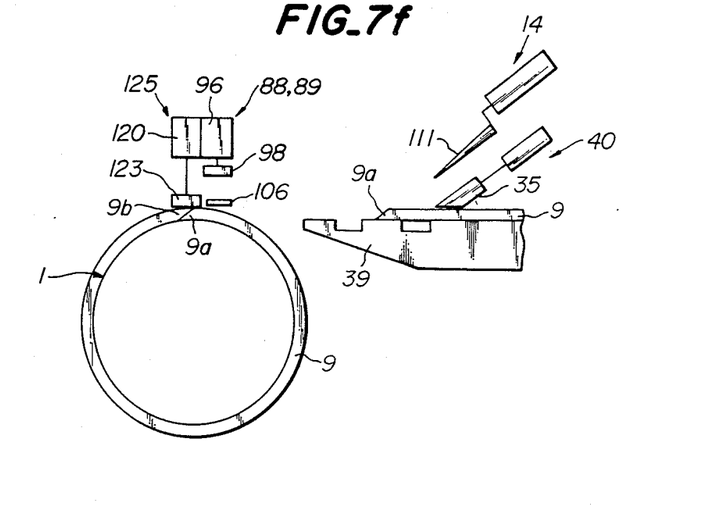

When the embracing portions 106 are brought into contact with the top portion of the forming drum 1, the rotation of the forming drum 1 and the movement of the embracing means 88 and 89 are stopped. During such an attachment of the materials to the forming drum 1, the piston rod 31 of the cylinder 29 is retracted to move the cutting blade 111 away from the anvil 39, while at the same time the piston rod 34 of the cylinder 33 is extended to continue holding the leading ends 9a of the belt-like materials 9 by means of the holding means 40. The piston rods 121 of the cylinders 120 are extended to move the press pads 123 toward the forming drum 1 so that the proximities of the trailing ends 9b of the belt-like materials 9 are pressed and attached to the forming drum 1. Thereafter, the piston rods 97 of the cylinders 96 are retracted to move the embracing pads 98 away from the belt-like materials 9 so as to release the trailing ends 9b of the belt-like materials 9. Such a condition is shown in FIG. 7e.

The piston rods 121 of the cylinders 120 are then retracted to disengage the press pads 123 from the belt-like materials 9. Thereafter, the motor 53 is energized to move the embracing means 88 and 89 slightly toward the anvil 39 so as to disengage the embracing portions 106 from the forming drum 1. When the embracing portions 106 is disengaged from the forming drum 1 in this manner, the piston rods 101 of the cylinders 100 are extended to cause the embracing portions 106 to retract from the positions immediately below the embracing pads 98. The motor 3 is then energized to rotate the forming drum 1 slightly so as to move the trailing ends 9b of the cut belt-like materials 9 to the positions immediately below the embracing pads 123. Thereafter, the piston rods 121 of the cylinders 120 are extended to urge the press pads 123 to the trailing ends 9b of the belt-like materials 9 for a predetermined period of time. Thus the leading and trailing ends 9a and 9b of the belt-like materials 9 are firmly and uniformly jointed with each other. Then, the piston rods 121 of the cylinders 120 are retracted to raise the press pads 123.

In the embodiment above described, the belt-like materials 9 are attached to the forming drum 1 under the tensile condition by driving the forming drum 1 at the circumferential speed of predetermined rate faster than the moving speed of the embracing means 88 and 89. According to the invention, however, the forming drum 1 may be driven at a circumferential speed equal to the moving speed of the embracing means 88 and 89. In the above embodiment, moreover, the press means 125 are connected to the embracing means 88 and 89, respectively so as to moved together with the embracing means. According to the invention, however, the press means 125 may be provided stationarily above the forming drum 1.

The motors 3 and 53 are the DC servomotors in the above embodiment. However, AC servomotors or pulse motors may be used with modified drivers 138 and 139. Although the leading ends 9a of the belt-like materials are transferred to the forming drum 1 by means of the embracing means 88 and 89, separate transfer means may be used for this purpose.

As can be seen from the above explanation, in order to attach remaining portions of belt-like materials being cut to a forming drum, trailing ends of the materials are embraced along their entire widths, and the forming drum and embracing means are controlled to keep the circumferential speed of the forming drum and the moving speed of the embracing means at a constant ratio, thereby uniformly joining both the ends of the belt-like materials.

It is further understood by those skilled in the art that the foregoing description is that of preferred embodiments of the disclosed apparatus and that various changes and modifications may be made in the invention without departing from the spirit and scope thereof.

What is claimed is:

1. An apparatus for attaching belt-like materials, comprising rotating means for rotating a forming drum, holding means located apart from said forming drum for holding continuous belt-like materials along their entire widths to be supplied to the forming drum, embracing means located between said forming drum and the holding means for embracing the belt-like materials along their entire widths, reciprocating means for reciprocating said embracing mans between the holding means and the forming drum, cutting means for cutting the belt-like materials in their width directions along lines between said holding means and said embracing means which have been stopped in the proximity of said holding means, said belt-like materials being held by said holding means and said embracing means, and control means for controlling said rotating means and said reciprocating means so that circumferential speeds of the forming drum and moving speeds of the embracing means are at a constant ratio, thereby after holding one portions of the belt-like materials attached to said forming drum with predetermined amounts along their entire widths by means of said holding means and embracing means, cutting said belt-like materials between said holding means and embracing means by means of said cutting means, and rotating said forming drum, while moving said embracing means embracing trailing ends of the belt-like materials toward said forming drum in controlling said circumferential speeds of said forming drum and said moving speeds of said embracing means at a constant ratio to attach remaining portions of the cut belt-like materials to said forming drum under an appropriate tensile force.

2. An apparatus as set forth in claim 1, wherein said holding means comprises a stationary frame, a bracket forward and downward inclined and supported by said frame, a carriage forward and downward slidably movable relative to said bracket, a number of cylinders fixed to said carriage holding blocks fixed to outer ends of piston rods of said cylinders and having elastic layers at their front end to be in contact with the belt-like materials, and an anvil fixed to said frame immediately below said holding blocks.

3. An apparatus as set forth in claim 1, wherein said embracing means comprises a traveling block movable in substantially traverse directions of a moving direction of the material, a cylinder whose piston rod is extensible and retractable toward and away from said material, an embracing pad wider than the maximum width of thematerla and fixed to an outer end of said piston rod of the cylinder, a horizontal cylinder whose piston rod is horizontally extensible and retractable, and an embracing portion supported by said piston rod of the horizontal cylinder, thereby embracing the belt-like material between the embracing pad and the embracing portion.

4. An apparatus as set forth in claim 3, wherein said embracing portion is accommodated by a movement of the piston rod supporting it in a straight groove formed in an anvil supporting the belt-like material being transferred toward said forming drum.

5. An apparatus as set forth in claim 1, wherein said reciprocating means comprises a traveling frame, a screw-threaded rod threadedly engaged in said traveling frame to reciprocate the traveling frame by rotations of the screw-threaded rod, and a motor for rotating the screw-threaded rod.

6. An apparatus as set forth in claim 1, wherein said control means comprises an operation sequence control device for memorizing predetermined operating programs of the apparatus and positional informations of component of the apparatus, a data processor for computing moving parameters of the component on the basis of the informations stored in said operation sequence control device, and a path positioning control unit for actuating driving means on the basis of informations sent from the data processor.

7. An apparatus as set forth in claim 1, wherein said apparatus comprises press means for pressing a leading end of the belt-like material to said forming drum when the leading end of the material has been transferred onto the forming drum by means of the embracing means.

8. An apparatus as set forth in claim 7, wherein said press means comprises a cylinder whose piston rod is extensible and retractable toward and away from the forming drum, and a press pad rockably supported by an outer end of the piston rod of the cylinder.

* * * * *